United States Patent
Morimoto

(10) Patent No.: US 12,499,755 B2
(45) Date of Patent: Dec. 16, 2025

(54) INFORMATION PROCESSING SYSTEM FOR DETERMINING CONGESTION DUE TO OVERFLOW FROM EXCLUSIVE TURN LANES

(71) Applicant: TOYOTA JIDOSHA KABUSHIKI KAISHA, Toyota (JP)

(72) Inventor: Kiyoaki Morimoto, Kasugai (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 100 days.

(21) Appl. No.: 18/434,996

(22) Filed: Feb. 7, 2024

(65) Prior Publication Data

US 2024/0378993 A1 Nov. 14, 2024

(30) Foreign Application Priority Data

May 9, 2023 (JP) .................................. 2023-077121

(51) Int. Cl.
*G08G 1/01* (2006.01)

(52) U.S. Cl.
CPC ......... *G08G 1/0141* (2013.01); *G08G 1/0133* (2013.01)

(58) Field of Classification Search
CPC .. G08G 1/0141; G08G 1/0133; G08G 1/0145; G08G 1/0125; G08G 1/0137; G08G 1/052; G08G 1/065; H04L 67/12; H04L 67/52

See application file for complete search history.

(56) References Cited

U.S. PATENT DOCUMENTS

| | | | |
|---|---|---|---|
| 2013/0275033 A1* | 10/2013 | Bastiaensen | G01C 21/26 701/119 |
| 2017/0004705 A1* | 1/2017 | Fowe | G08G 1/0116 |
| 2017/0004707 A1* | 1/2017 | Fowe | G01C 21/3658 |
| 2019/0227544 A1* | 7/2019 | Aoki | B60W 30/18163 |
| 2019/0278280 A1* | 9/2019 | Imai | B60W 30/09 |
| 2020/0082716 A1* | 3/2020 | Britt | G01C 21/3492 |
| 2020/0180639 A1* | 6/2020 | Mizoguchi | B60W 60/001 |
| 2020/0208998 A1* | 7/2020 | Xiang | G06F 16/29 |
| 2020/0327812 A1* | 10/2020 | Ran | G08G 1/096783 |
| 2021/0174669 A1* | 6/2021 | Guan | G06N 3/08 |
| 2021/0197826 A1* | 7/2021 | Baum | H04W 4/46 |
| 2021/0261116 A1* | 8/2021 | Hosokawa | H04W 4/44 |
| 2022/0101722 A1* | 3/2022 | Lee | G08G 1/163 |
| 2022/0135039 A1* | 5/2022 | Jardine | B60W 30/18163 701/26 |
| 2022/0204053 A1* | 6/2022 | Taniguchi | B60W 40/114 |
| 2022/0205799 A1* | 6/2022 | Radakovic | G08G 1/096816 |
| 2022/0289228 A1* | 9/2022 | Yamamoto | B60K 35/80 |

(Continued)

FOREIGN PATENT DOCUMENTS

JP 2019-028000 A 2/2019

*Primary Examiner* — Sze-Hon Kong
(74) *Attorney, Agent, or Firm* — SoraIP, Inc.

(57) ABSTRACT

An information processing device includes a control unit configured to acquire an upstream end of a range of a right-turn or left-turn exclusive lane in response to occurrence of traffic congestion, and output information on the occurrence of the traffic congestion due to a vehicle overflowing the exclusive lane, in response to a predetermined first proportion or more of vehicles having changed lanes in a direction away from the exclusive lane at a position upstream of the upstream end of the range of the exclusive lane.

4 Claims, 5 Drawing Sheets

(56) References Cited

U.S. PATENT DOCUMENTS

| | | | | |
|---|---|---|---|---|
| 2023/0092432 A1* | 3/2023 | Clifford | ................ | G08G 1/015 |
| | | | | 701/117 |
| 2023/0316905 A1* | 10/2023 | Yoshioka | ............... | G08G 1/052 |
| | | | | 701/119 |
| 2023/0386330 A1* | 11/2023 | Nguyen | ................ | G08G 1/056 |

* cited by examiner

FIG. 3

TRAVEL INFORMATION DB

| VEHICLE ID | VEHICLE SPEED | LOCATION | STEERING ANGLE | TIME |
|---|---|---|---|---|
| V001 | xxx | xxx | xxx | xxx |
| ... | ... | ... | ... | ... |

INFORMATION PROCESSING SYSTEM FOR DETERMINING CONGESTION DUE TO OVERFLOW FROM EXCLUSIVE TURN LANES

CROSS-REFERENCE TO RELATED APPLICATION

This application claims priority to Japanese Patent Application No. 2023-077121 filed on May 9, 2023, incorporated herein by reference in its entirety.

BACKGROUND

1. Technical Field

The present disclosure relates to information processing devices.

2. Description of Related Art

Japanese Unexamined Patent Application Publication No. 2019-028000 (JP 2019-028000 A) discloses that, when the proportion of vehicles occupying a right-turn exclusive lane is a first predetermined proportion or more, and the proportion of vehicles occupying a travel lane(s) other than the right-turn exclusive lane is a second predetermined proportion or less, it is determined that there is traffic congestion due to right-turn traffic.

SUMMARY

It is an object of the present disclosure to more accurately detect when traffic congestion occurs due to vehicles overflowing a right-turn or left-turn exclusive lane.

An information processing device according to an aspect of the present disclosure includes:
a control unit configured to
acquire an upstream end of a range of a right-turn or left-turn exclusive lane in response to occurrence of traffic congestion; and
output information on the occurrence of the traffic congestion due to a vehicle overflowing the exclusive lane, in response to a predetermined first proportion or more of vehicles having changed lanes in a direction away from the exclusive lane at a position upstream of the upstream end of the range of the exclusive lane.

Other aspects of the present disclosure relate to an information processing method that causes a computer to perform the above information processing, a program that causes a computer to perform the information processing method, and a non-transitory computer-readable storage medium storing the program.

According to the present disclosure, it is possible to more accurately detect when traffic congestion occurs due to vehicles overflowing a right-turn or left-turn exclusive lane.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 3 is a diagram illustrating the table structure of the travel information DB;

DETAILED DESCRIPTION OF EMBODIMENTS

Figure 1:
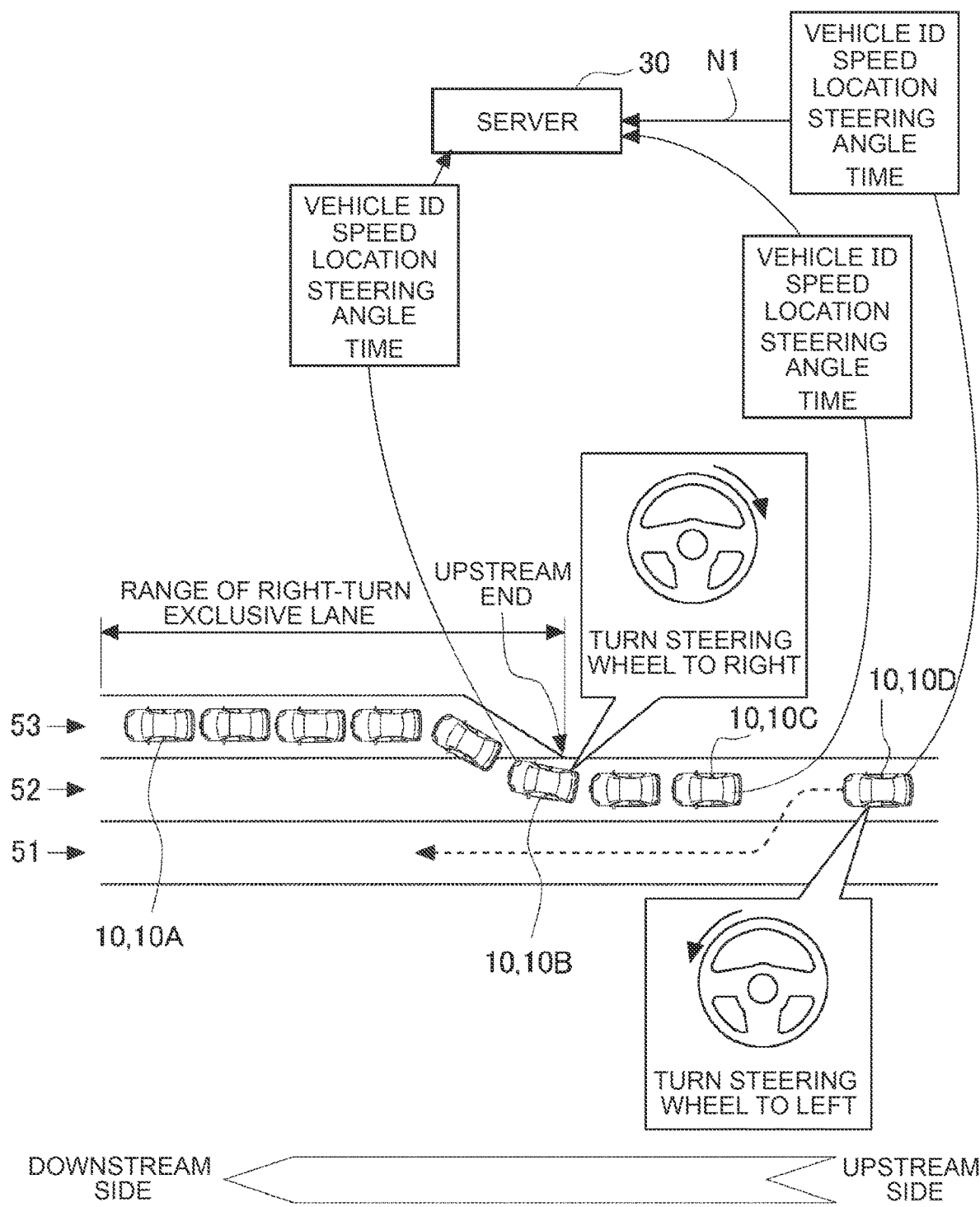
FIG. 1 is a diagram showing a schematic configuration of a system according to an embodiment.

On a road with multiple lanes, some lanes may become congested. For example, even when traffic congestion occurs in a right-turn exclusive lane that is a lane exclusively for right turns, or a left-turn exclusive lane that is a lane exclusively for left turns, there may be no traffic congestion in the through lane. Since what measures to take is different depending on which lane is congested and what causes this traffic congestion, it is necessary to understand which lane is congested and what causes this traffic congestion. For example, when vehicles concentrate on a right-turn exclusive lane, the vehicles may not fit in the right-turn exclusive lane and overflow into a through lane. In this case, when there is a plurality of through lanes, only the right through lane may be congested.

Here, it is also conceivable to specify the lane where the traffic congestion is occurring by specifying the position of the vehicle using, for example, a GPS device installed in the vehicle. However, since the GPS device installed in a vehicle has low accuracy in detecting a position, it may be difficult to identify the lane in which the vehicle is traveling. It is also conceivable to acquire image data from vehicles and identify lanes in which traffic is congested. However, trying to constantly acquire image data captured by a vehicle is not practical because the amount of communication would be enormous.

In order to solve this problem, an information processing device according to one of aspects of the present disclosure includes a control unit configured to: acquire an upstream end of a range of a right-turn or left-turn exclusive lane in response to occurrence of traffic congestion; and output information on the occurrence of the traffic congestion due to a vehicle overflowing the exclusive lane, in response to a predetermined first proportion or more of vehicles having changed lanes in a direction away from the exclusive lane at a position upstream of the upstream end of the range of the exclusive lane.

For example, it is possible to specify the section where traffic congestion is occurring based on the position information and speed information of each vehicle. For example, if the average value of the speeds of vehicles traveling in the target section is a speed corresponding to traffic congestion, it can be determined that traffic congestion is occurring. However, even if it is possible to identify that traffic congestion is occurring, it is not possible to identify the lane in which the traffic congestion is occurring. Therefore, the control unit obtains the upstream end of the range of the right-turn or left-turn exclusive lane. The exclusive lane is a lane for vehicles to turn right or left. The range of the exclusive lane may be the length of the exclusive lane. The upstream end of the exclusive lane range is where the exclusive lane begins. The upstream end of the exclusive lane range can be specified, for example, based on the behavior of the vehicle or based on map information. For example, when a vehicle enters a right-turn exclusive lane, the driver turns the steering wheel to the right. The steering angle when the vehicle enters the right-turn exclusive lane falls within a specific range. Therefore, the upstream end of the right-turn exclusive lane can be specified based on the steering angle. The upstream end may be specified as a section with a certain width.

When vehicles no longer fit in the exclusive lane and overflow the exclusive lane into the through lane, vehicles traveling in a through lane may change their direction of travel to avoid the vehicles overflowing the exclusive lane. That is, the driver may perform avoidance travel in order to avoid getting his or her vehicle caught up in traffic congestion. At this time, the vehicle changes lanes in a direction away from the exclusive lane. When there are vehicles overflowing the exclusive lane, avoidance travel is performed at a position upstream of the upstream end of the range of the exclusive lane travel. Therefore, when a predetermined first proportion or more of vehicles changes lanes in a direction away from the exclusive lane at a position upstream of the upstream end of the range of the exclusive lane, it can be determined that traffic congestion has occurred due to the vehicles overflowing the exclusive lane. The predetermined first proportion is a lower limit value of the proportion of vehicles that performs avoidance travel when traffic congestion occurs due to vehicles overflowing the exclusive lane. In this case, the control unit outputs information regarding the occurrence of traffic congestion caused by vehicles overflowing the exclusive lane. This makes it possible to understand that traffic congestion is occurring due to vehicles waiting to turn right or left. Therefore, the cause of traffic congestion can be ascertained without having to go to the location.

Hereinafter, embodiments of the present disclosure will be described with reference to the drawings. The configurations of the following embodiments are illustrative, and the present disclosure is not limited to the configurations of the embodiments. Further, the following embodiments can be combined as much as possible.

First Embodiment

FIG. 1 is a diagram schematically showing a system 1 according to an embodiment. In the example of FIG. 1, the system 1 includes a plurality of vehicles 10 and a server 30. The vehicle 10 and the server 30 are connected together via a network N1. Note that the network N1 is, for example, a world-wide public communication network such as the Internet, and a Wide Area Network (WAN) or other communication network may be adopted. In addition, the network N1 may include a telephone communication network such as a mobile phone network and a wireless communication network such as Wi-Fi (registered trademark).

In the example shown in FIG. 1, on a road having a first through lane 51, a second through lane 52, and a right-turn exclusive lane 53, a plurality of vehicles 10 is lined up in the right-turn exclusive lane 53 and overflow into the second through lane 52, causing traffic congestion. Note that the vehicle 10 at the head of the traffic congestion is assumed to be the first vehicle 10A. The vehicle 10 that has started changing lanes from the second through lane 52 to the right-turn exclusive lane 53 is referred to as a second vehicle 10B. The last vehicle 10 in the traffic congestion is assumed to be a third vehicle 10C. The vehicle 10 approaching the third vehicle 10C from the rear (that is, from the upstream side) and traveling in the second through lane 52 is referred to as a fourth vehicle 10D. Note that if the vehicle is not specified, it will simply be referred to as vehicle 10.

Each vehicle 10 sends information on the speed (hereinafter also referred to as speed information), information on the location (hereinafter also referred to as location information), and information on the steering angle (hereinafter referred to as steering angle information) to the server 30 at predetermined intervals together with the vehicle ID and time information. The vehicle ID is an identifier unique to the vehicle 10. Note that the speed information, position information, steering angle information, time information, and vehicle ID transmitted from the vehicle 10 to the server 30 are collectively referred to as travel information. Based on the travel information, the server 30 determines whether traffic congestion (hereinafter referred to as right-turn traffic congestion) occurs due to the vehicles 10 overflowing the right-turn exclusive lane 53 into the second through lane 52.

Figure 2:
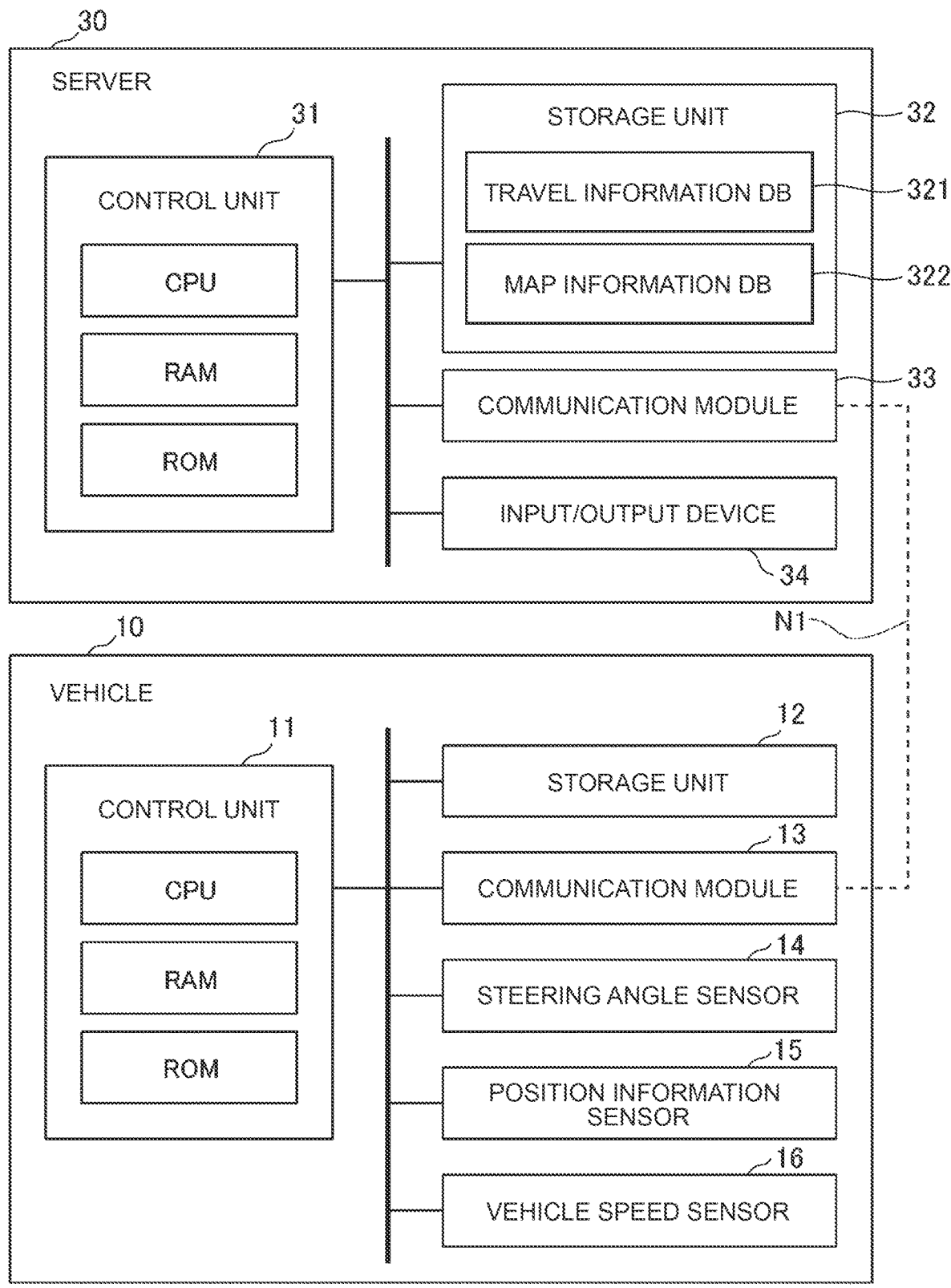
FIG. 2 is a block diagram schematically showing an example of the configuration of a vehicle and a server that constitute the system according to the embodiment.

Next, the hardware and software configurations of the vehicle 10 and the server 30 will be described based on FIG. 2. FIG. 2 is a block diagram schematically showing an example of the respective configurations of the vehicle 10 and the server 30 that constitute the system 1 according to the present embodiment. The server 30 includes a control unit 31, a storage unit 32, a communication module 33, and an input/output device 34.

The server 30 can be configured as a computer having a processor (CPU, GPU, etc.), a main storage device (RAM, ROM, etc.), and an auxiliary storage device (EPROM, hard disk drive, removable media, etc.). The auxiliary storage device stores an operating system (OS), various programs, various tables, etc., and by executing the programs stored there, each function (software module) matching a predetermined purpose, as described below, can be realized. However, some or all of the modules may be realized as a hardware module by, for example, a hardware circuit such as an ASIC or an FPGA.

The control unit 31 is an arithmetic unit that implements various functions of the server 30 by executing a predetermined program. The control unit 31 can be realized by, for example, a hardware processor such as a CPU. Further, the control unit 31 may include a RAM, a read only memory (ROM), a cache memory, and the like. Details of the control unit 31 will be described later.

The storage unit 32 is a means for storing information, and is composed of a storage medium such as a RAM, a magnetic disk, or a flash memory. The storage unit 32 stores programs executed by the control unit 31, data used by the programs, and the like. Further, databases (travel information DB 321 and map information DB 322) are constructed in the storage unit 32, and the traveling information and map information collected from each vehicle 10 are stored in the database.

FIG. 3 is a diagram illustrating the table structure of the travel information DB 321. The traveling information table has fields of vehicle ID, vehicle speed, position, steering angle, and time. Identification information for identifying the vehicle 10 is input into the vehicle ID field. Information regarding the speed of the vehicle 10 is input into the vehicle speed field. The information regarding the speed of the vehicle 10 includes information regarding the detection value of the vehicle speed sensor 16. Information regarding the location of the vehicle 10 is input into the location field. The information regarding the position of the vehicle 10 includes information regarding the detection value of the position information sensor 15. Information regarding the steering angle of the vehicle 10 is input into the steering angle field. The information regarding the steering angle of the vehicle 10 includes information regarding the detection value of the steering angle sensor 14. Information regarding the time at which the vehicle speed, position, and steering angle of the vehicle 10 are acquired is input into the time field. Note that, as an alternative method, the time at which the travel information is received from the vehicle 10 may be input into the time field.

The map information DB 322 also includes, as map information, link data related to roads (links), node data related to node points, intersection data related to each intersection, search data for searching routes, section data related to sections, and, lane data regarding the number of lanes, etc. are stored. As another example, the map information DB 322 may store information on the ranges of right-turn exclusive lanes and information on the upstream ends of the ranges of the right-turn exclusive lanes.

The communication module 33 is a communication interface for connecting the server 30 to the network N1. The communication module 33 may be configured to include, for example, a network interface board, a wireless communication interface for wireless communication, and the like. The server 30 can perform data communication with each vehicle 10 via the communication module 33.

The input/output device 34 is a means for accepting input operations performed by an operator and presenting information to the operator. Specifically, the input/output device 34 includes a device for performing input such as a mouse and a keyboard, and a device for performing output such as a display and a speaker. The input/output device 34 may be integrally configured with, for example, a touch panel display.

Note that in the specific hardware configuration of the server 30, components can be omitted, replaced, or added as appropriate depending on the embodiment.

Next, the vehicle 10 will be described. The vehicle 10 includes a control unit 11, a storage unit 12, a communication module 13, a steering angle sensor 14, a position information sensor 15, and a vehicle speed sensor 16. The control unit 11 is an arithmetic unit that implements various functions of the vehicle 10 by executing predetermined programs. The control unit 11 can be realized by, for example, a hardware processor such as a CPU. Further, the control unit 11 may be configured to include a RAM, a read only memory (ROM), a cache memory, and the like.

The storage unit 12 is a means for storing information, and is constituted by a storage medium such as a RAM, a magnetic disk, or a flash memory. The storage unit 12 stores programs executed by the control unit 11, data used by the programs, and the like. The storage unit 12 stores detection values of various sensors.

The communication module 13 is a communication means for connecting the vehicle 10 to the network N1. In this embodiment, the vehicle 10 can communicate with other devices (for example, the server 30) via the network N1 using mobile communication services such as 3G, LTE, 5G, and 6G.

The steering angle sensor 14 is a sensor that detects a steering angle obtained by a steering operation. The steering angle sensor 14 detects, for example, the angle of the steering wheel. Note that in this embodiment, the angle of the steering wheel is detected as the steering angle, but a value that directly or indirectly represents the steering angle of the tire may also be used.

The position information sensor 15 acquires position information (for example, latitude and longitude) of the vehicle 10 at a predetermined cycle. The position information sensor 15 is, for example, a Global Positioning System (GPS) receiving section, a wireless communication section, or the like. Vehicle speed sensor 16 is a sensor that detects the speed of vehicle 10.

The control unit 11 of the vehicle 10 transmits the detection values of the steering angle sensor 14, position information sensor 15, and vehicle speed sensor 16 to the server 30 together with the vehicle ID and time information at predetermined intervals. That is, the control unit 11 of the vehicle 10 transmits travel information to the server 30 at predetermined intervals.

Next, the control unit 31 of the server 30 will be explained in detail. The control unit 31 of the server 30 identifies the location where traffic congestion has occurred based on travel information acquired from each vehicle 10. The control unit 31 calculates the average speed of the vehicle 10 for each target section, and determines that traffic congestion has occurred if the average speed is less than or equal to a first vehicle speed (for example, 20 km/h). At this time, it is not specified in which lane the traffic congestion has occurred.

Next, the control unit 31 of the server 30 specifies the upstream end of the range of the right-turn exclusive lane 53 shown in FIG. 1 based on the travel information acquired from each vehicle 10. Here, the upstream end of the range of the right-turn exclusive lane 53 is specified in order to determine whether an event to be described later is occurring upstream of the end of the traffic congestion. This upstream end is where the right-turn exclusive lane 53 begins. The upstream end of the range of the right-turn exclusive lane 53 is specified based on the steering operation performed by the driver of the vehicle 10. When the vehicle 10 that is going to turn right enters the right-turn exclusive lane 53 from the second through lane 52, the vehicle 10 exhibits a behavior of changing lanes to the right. Therefore, it can be determined that the location where the steering wheel is frequently turned to the right is the location where the right-turn exclusive lane 53 begins. For example, the control unit 31 controls the right-turn exclusive lane 53 in a section where the proportion of vehicles 10 whose steering angle detected by the steering angle sensor 14 is within a first range (for example, 5 to 20 degrees) is equal to or higher than a predetermined second proportion. It is determined that it is the start section (first section). Note that the steering angle has a positive value when the steering wheel is turned to the right, and a negative value when the steering wheel is turned to the left. The first range of the steering angle (for example, 5 to 20 degrees) is the steering angle when the vehicle 10 enters the right-turn exclusive lane 53. Note that the upstream end of the range of the right-turn exclusive lane 53 may be specified as a section with a constant width. For example, if the target section is divided into a plurality of sections, and in each divided section, the proportion of vehicles 10 whose steering angles detected by the steering angle sensor 14 are in the first range is equal to or higher than a predetermined second proportion, The section may be specified as the upstream end of the range of the right-turn exclusive lane 53. Further, as another example, the control unit 31 may specify the starting section of the right-turn exclusive lane 53 based on information stored in the map information DB 322.

The control unit 31 of the server 30 determines whether right-turn traffic congestion has occurred. When the vehicles 10 overflowing the right-turn exclusive lane 53 are stopped, the following fourth vehicle 10D shows a behavior of avoiding the third vehicle 10C stopped due to right-turn traffic congestion (hereinafter referred to as avoidance travel behavior). By detecting this avoidance travel behavior, the position of the third vehicle 10C can be identified, and it can also be determined that the right-turn traffic congestion has occurred. The control unit 31 specifies the position of the third vehicle 10C based on the steering operation of the vehicle 10 located in the target section. The fourth vehicle 10D that travels so as to avoid the third vehicle 10C exhibits a behavior of changing lanes to the left. Therefore, it can be determined that the location where the steering wheel is frequently turned to the left is the location of the last vehicle 10 of the right-turn traffic congestion (that is, the third vehicle 10C). The control unit 31 determines that the section where the proportion of the vehicles 10 whose steering angle detected by the steering angle sensor 14 is in the second range (for example, 0 to −20 degrees) is equal to or higher than a predetermined first proportion is the section where there is the third vehicle 10C. The second range of the steering angle (for example, 0 to −20 degrees) is the steering angle when the vehicle 10 changes lanes from the second through lane 52 to the first through lane 51. Note that the position where the third vehicle 10C exists may be specified as a section with a certain width. For example, if the target section is divided into a plurality of sections, and in each divided section, the proportion of vehicles 10 whose steering angle detected by the steering angle sensor 14 is in the second range is greater than or equal to a predetermined first proportion, may be specified as the position where the third vehicle 10C exists. The position where the third vehicle 10C is located may be a second section where a predetermined first proportion or more of the vehicles 10 have changed lanes in a direction away from the right-turn exclusive lane 53.

When there is the third vehicle 10C that is the last vehicle of the right-turn traffic congestion, the control unit 31 determines that the right-turn traffic congestion has occurred. Then, the control unit 31 outputs traffic congestion information indicating that right-turn traffic congestion has occurred. At this time, the control unit 31 causes the display included in the input/output device 34 to display, for example, the location where the right-turn traffic congestion has occurred and the length of the right-turn traffic congestion. Note that, as another example, traffic congestion information may be provided to the vehicle 10.

Figure 4:
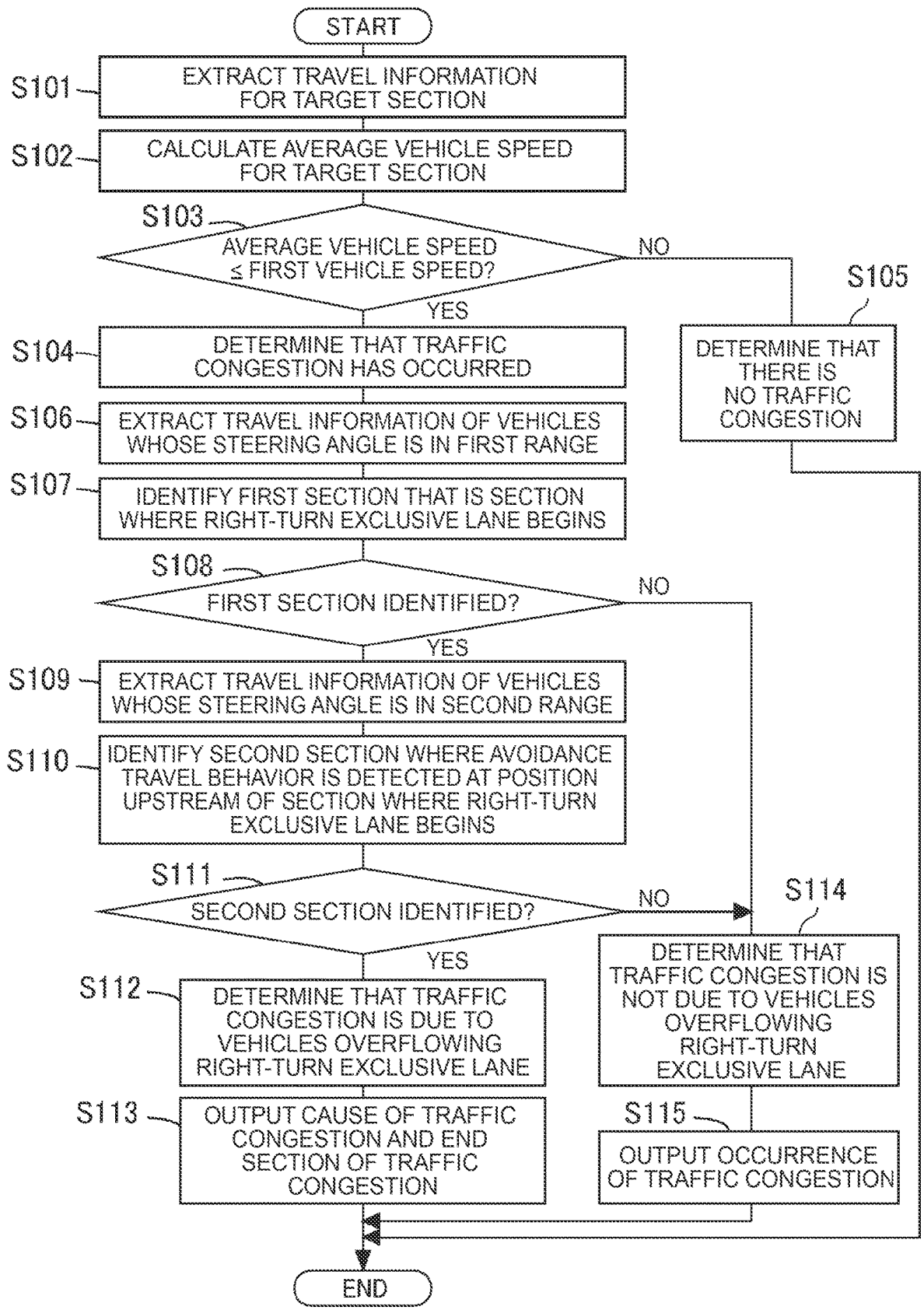
FIG. 4 is a flowchart showing a process of determining whether a right turn traffic congestion is occurring in the server according to the first embodiment.

Next, a process for determining whether right-turn traffic congestion has occurred in the server 30 will be described. FIG. 4 is a flowchart showing a process of determining whether right-turn traffic congestion has occurred by the server 30 in the first embodiment. The flowchart shown in FIG. 4 is executed in the server 30 at predetermined time intervals for each target section. Note that the description will be made assuming that the travel information DB 321 stores driving information corresponding to a plurality of vehicles 10.

In S101, the control unit 31 extracts travel information for the target section. The target section is a section in which it is determined whether or not right-turn traffic congestion is occurring. The target section may correspond to a link stored in the map information DB 322. Further, the target section may be specified by the operator via the input/output device 34. The control unit 31 determines the location of the vehicle 10 that has traveled in the target section during a predetermined period based on the position information stored in the travel information DB 321 and the information regarding the position of each section stored in the map information DB 322. Extract driving information. The predetermined period is a period that can be considered to represent the current situation of the target section. As a result, only travel information that is considered to represent the current situation in the target section is used. Next, in S102, the control unit 31 calculates the average vehicle speed of the vehicles 10 existing in the target section during the above-mentioned predetermined period. That is, the control unit 31 calculates the average value of the vehicle speeds stored in the vehicle speed field of the traveling information extracted in S101.

In S103, the control unit 31 determines whether the average vehicle speed calculated in S102 is less than or equal to the first vehicle speed. The first vehicle speed is stored in the storage unit 32 as the upper limit of vehicle speed when traffic congestion occurs. The first vehicle speed is, for example, 20 km/h. If an affirmative determination is made in S103, the process advances to S104, and if a negative determination is made, the process advances to S105. In S104, the control unit 31 determines that traffic congestion is occurring in the target section. On the other hand, in S105, the control unit 31 determines that there is no traffic congestion in the target section.

In S106, the control unit 31 extracts the driving information of the vehicle 10 whose steering angle is in the first range from among the vehicles 10 whose driving information was extracted in S101. The first range is the range of the steering angle when changing lanes from the second through lane 52 to the right-turn exclusive lane 53, and is, for example, 5 to 20 degrees. The first range is stored in the storage unit 32. In S107, the control unit 31 specifies a first section that is the section where the right-turn exclusive lane 53 starts (that is, the upstream end of the range of the right-turn exclusive lane 53). Here, the control unit 31 determines a section where the vehicle 10 whose steering angle is in the first range frequently appears to be the first section. For example, when there is a section where the proportion of the number of vehicles 10 for which travel information was extracted in S106 to the number of vehicles 10 for which travel information was extracted in S101 is equal to or higher than a predetermined second proportion, the control unit 31 identifies the section as the first section. The predetermined second proportion is stored in advance in the storage unit 32 as a value corresponding to the section where the right-turn exclusive lane 53 begins.

In S108, the control unit 31 determines whether the first section has been identified. If the first section is not specified in S107, it can be said that there are almost no vehicles 10 entering the right-turn exclusive lane 53. In this case, it is considered that the traffic congestion is not right-turn traffic congestion, but is caused by other factors. If an affirmative determination is made in S108, the process advances to S109, and if a negative determination is made, the process advances to S114.

In S109, the control unit 31 extracts the driving information of the vehicle 10 whose steering angle is in the second range from among the vehicles 10 whose driving information was extracted in S101. The second range is the range of the steering angle when changing lanes from the second through lane 52 to the first through lane 51, and is, for example, 0 to −20 degrees. The second range is stored in the storage unit 32. In S110, the control unit 31 specifies a second section, which is a section where the avoidance travel behavior is detected upstream of the first section. Here, the control unit 31 determines the section where the vehicle 10 whose steering angle is in the second range frequently appears to be the second section. For example, when there is a section where the proportion of the number of vehicles 10 for which travel information was extracted in S109 to the number of vehicles 10 for which travel information was extracted in S101 is equal to or higher than a predetermined first proportion, the control unit 31 identifies this section as a second section. The predetermined first proportion here is stored in advance in the storage unit 32 as a value corresponding to the avoidance travel behavior. Conditions related to speed may be added as the avoidance travel behavior. When right-turn traffic congestion occurs, the speeds of the vehicles 10 traveling in the second through lane 52 decrease. Therefore, a vehicle 10 whose speed is below a predetermined speed and whose steering angle is in the second range may be treated as a vehicle 10 exhibiting the avoidance travel behavior, and travel information may be extracted in S109.

In S111, the control unit 31 determines whether the second section has been identified. If the second section is not identified in S111, it can be said that there are almost no vehicles 10 exhibiting the avoidance travel behavior. In this case, it is considered that the traffic congestion is not right-turn traffic congestion, but is caused by other factors. If an affirmative determination is made in S111, the process advances to S112, and if a negative determination is made, the process advances to S114.

In S112, the control unit 31 determines that the traffic congestion is congestion caused by the vehicles 10 overflowing the right-turn exclusive lane 53 (that is, right-turn traffic congestion). Then, in S113, the control unit 31 outputs that right-turn traffic congestion has occurred in the target section, and outputs the second section that is the last section of the right-turn traffic congestion. On the other hand, in S114, the control unit 31 determines that the traffic congestion is not congestion caused by the vehicles 10 overflowing the right-turn exclusive lane 53 (that is, right-turn traffic congestion). Then, in S115, the control unit 31 outputs occurrence of the traffic congestion and the target section where the traffic congestion has occurred.

As described above, according to the present embodiment, when right-turn traffic congestion occurs, it is possible to detect the occurrence of the right-turn traffic congestion and to identify the last section of the right-turn traffic congestion. Therefore, there is no need to go to the site to investigate the cause of traffic congestion.

Second Embodiment

In the second embodiment, in order to further improve the accuracy of detecting the occurrence of the right-turn traffic congestion, the speed of the vehicle 10 is further used to determine whether the right-turn traffic congestion has occurred. When right-turn traffic congestion has occurred, the vehicle 10 stops or moves at low speed on the upstream side of the first section. Therefore, only when the speed of the vehicle 10 is intermittently lower than the predetermined speed on the upstream side of the first section, it is determined that right-turn traffic congestion has occurred. The predetermined speed here is the speed when right-turn traffic congestion has occurred, and may be, for example, 0 km/h.

Figure 5:
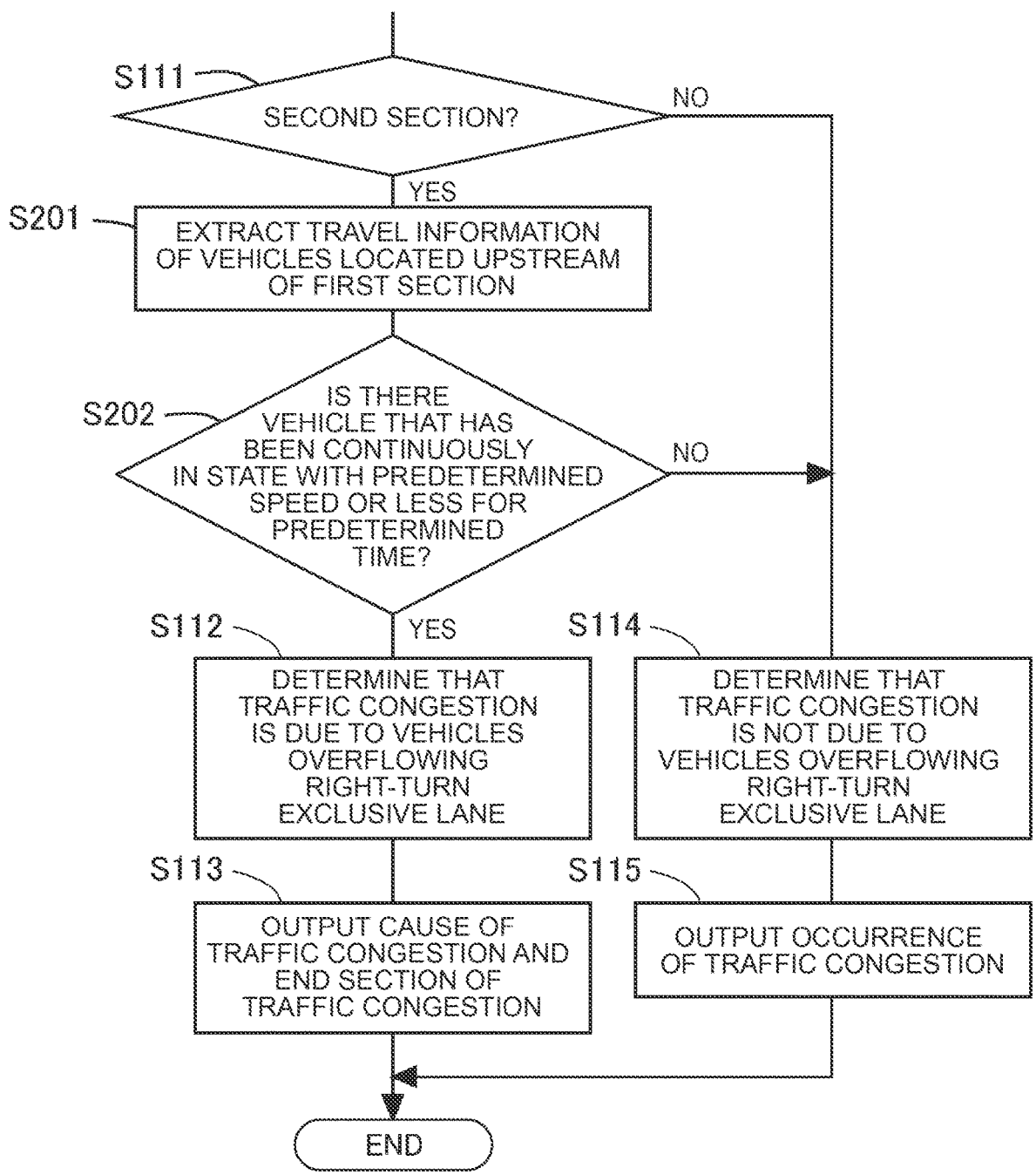
FIG. 5 is a flowchart showing a process of determining whether a right turn traffic congestion is occurring in a server according to the second embodiment.

Next, a process for determining whether right-turn traffic congestion has occurred by the server 30 will be described. FIG. 5 is a flowchart showing a process of determining whether right turn traffic congestion has occurred in the server 30 in the second embodiment. Description of steps in which the same processing is executed in the flowchart shown in FIG. 4 will be omitted. Furthermore, since the processing before S111 is the same as the flowchart shown in FIG. 4, illustration thereof will be omitted.

In the flowchart shown in FIG. 5, if an affirmative determination is made in S111, the process advances to S201. In S201, the control unit 31 extracts travel information of the vehicle 10 located upstream of the first section. Note that what is extracted may be limited to travel information of vehicles 10 located in the second section or vehicles 10 located within a predetermined range from the second section. In S202, the control unit 31 determines whether there is a vehicle 10 whose speed has been below a predetermined speed for a predetermined period of time, based on the traveling information of the vehicle 10 extracted in S201. The predetermined time is stored in the storage unit 32 as a stopping time when right-turn traffic congestion has occurred. If an affirmative determination is made in S202, the process advances to S112, and if a negative determination is made, the process advances to S114.

As described above, according to the present embodiment, it is possible to improve the accuracy of detecting the occurrence of right-turn traffic congestion.

Other Embodiments

The above embodiments are only examples, and the disclosure may be carried out with various modifications without departing from the essence thereof. The processes and means described in the present disclosure can be freely combined and implemented as long as no technical contradiction occurs. Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function. In the above embodiment, the description is given using a right-turn exclusive lane as an example, but the present disclosure is similarly applicable to a left-turn exclusive lane. In this case, the fourth vehicle 10D approaching the end of the traffic congestion exhibits the avoidance travel behavior toward the lane on the right side. In the above embodiment, the fourth vehicle 10D changes lanes from the second through lane 52 to the first through lane 51 in order to avoid the third vehicle 10C. The avoidance travel behavior of the fourth vehicle 10D is not limited to this, and includes, for example, a behavior of avoiding to the left in the second through lane 52.

The disclosure can also be implemented by providing a computer program in which the functions described in the embodiments are implemented to a computer, and by one or more processors included in the computer reading and executing the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc read-only memory (CD-ROM), digital versatile disc (DVD), Blu-ray disc, etc.), a read only memory (ROM), a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. An information processing device comprising:
 a processor and a memory storing instructions that, in a case executed by the processor, cause the processor to
 acquire, from a plurality of vehicles present in a predetermined section of a road, speed information via a speed sensor mounted on each of the plurality of the vehicles, location information via a global positioning system mounted on each of the plurality of the vehicles, and steering angle information obtained via a steering angle sensor mounted on each of the plurality of the vehicles, each of the speed information, the location information, and the steering angle information associated with a vehicle identification and time of the plurality of vehicle;

calculate an average vehicle speed of the plurality of vehicles in the predetermined section, wherein, in a case where the average vehicle speed is equal to or less than a first predetermined threshold, traffic congestion is determined to have occurred;

identify a first section corresponding to an upstream end of a range of an exclusive lane, where a first proportion of the plurality of vehicles exhibits steering angle of from 5 to 20 degrees towards the exclusive lane, indicating a start of the exclusive lane;

identify a second section located upstream of the first section, where a second proportion of the plurality of vehicles exhibits steering angle of from 0 to −20 degrees away from the exclusive lane and a speed lower than a second predetermined threshold, indicating lane changes of the second portion away from the exclusive lane;

identify a third section located between the first section and the second section;

determine that traffic congestion due to an overflow of vehicles from the exclusive lane has occurred in a case where the first section and the second section are identified;

in a case where the traffic congestion due to the overflow of vehicles from the exclusive lane has occurred, output information on an occurrence of the traffic congestion due to the overflow of vehicles from the exclusive lane; and in a case where at least one of the first section and the second section is not identified, output information on an occurrence of traffic congestion due to a different reason from the overflow of vehicles from the exclusive lane has occurred, wherein the exclusive lane includes a right-turn exclusive lane and a left-turn exclusive lane in which the plurality of vehicles are allowed to make a right turn only or a left turn only, respectively.

2. The information processing device according to claim 1, wherein the first predetermined threshold is 20 km/h.

3. The information processing device according to claim 1, wherein the third section is identified as a section in which a third proportion of the plurality of vehicles are stopped or traveling at a speed equal to or less than a third predetermined threshold.

4. The information processing device according to claim 2, wherein the third section is identified as a section in which a third proportion of the plurality of vehicles are stopped or traveling at a speed equal to or less than a third predetermined threshold.

* * * * *